United States Patent
Takahashi et al.

(10) Patent No.: US 6,290,928 B1
(45) Date of Patent: Sep. 18, 2001

(54) GAMMA LITHIUM ALUMINATE PRODUCT AND PROCESS OF MAKING

(75) Inventors: Hitose Takahashi; Nobuyuki Yamazaki, both of Tokyo; Takenori Watanabe, Chiba; Katsumi Suzuki, Kanagawa, all of (JP)

(73) Assignee: Nippon Chemicals Industrial Co., Tokyo (JP)

( * ) Notice: Subject to any disclaimer, the term of this patent is extended or adjusted under 35 U.S.C. 154(b) by 0 days.

(21) Appl. No.: 09/203,530

(22) Filed: Dec. 1, 1998

Related U.S. Application Data

(63) Continuation-in-part of application No. 08/835,387, filed on Apr. 7, 1997, now abandoned.

(51) Int. Cl.$^7$ .............................. C01D 15/00; C01F 7/00
(52) U.S. Cl. ............................................................ 423/600
(58) Field of Search ............................... 423/600, 119; 429/16, 46, 319, 320

(56) References Cited

U.S. PATENT DOCUMENTS

| | | | |
|---|---|---|---|
| 3,878,296 | * 4/1975 | Vine et al. | 423/600 |
| 3,998,939 | 12/1976 | Mason et al. | 423/600 |
| 4,704,266 | * 11/1987 | Kadokura et al. | 423/600 |
| 5,217,702 | * 6/1993 | Frianeza-kullberg | 423/600 |
| 5,252,315 | * 10/1993 | Higashiyama et al. | 423/600 |
| 5,434,031 | 7/1995 | Nakao et al. | |
| 5,580,673 | * 12/1996 | Farooque et al. | 429/46 |

FOREIGN PATENT DOCUMENTS

| | | | |
|---|---|---|---|
| 60-65719 | 4/1985 | (JP) | . |
| 60-151975 | 8/1985 | (JP) | . |
| 61-295227 | 12/1986 | (JP) | . |
| 61-295228 | 12/1986 | (JP) | . |
| 63-260812 | 10/1988 | (JP) | . |
| 63-270311 | 11/1988 | (JP) | . |
| 1-252522 | 10/1989 | (JP) | . |
| 2-80319 | 3/1990 | (JP) | . |
| 2-233519 | 9/1990 | (JP) | . |
| 5-294614 | * 11/1993 | (JP) | 423/600 |

OTHER PUBLICATIONS

Kinoshita et al., "Synthesis of fine particle size lithium aluminate . . . " Mat. Res. Bull. vol. 14, pp. 1357–1368, 12/79.

* cited by examiner

*Primary Examiner*—Steven Bos
(74) *Attorney, Agent, or Firm*—Oblon, Spivak, McClelland, Maier & Neustadt, P.C.

(57) ABSTRACT

γ-type lithium aluminate, a particle of which has a BET specific surface area in a range of from 1 to 15 $m^2/g$ and a synthesized degree (P) of not less than 80% is disclosed. The synthesized degree (P) is defined by the equation, $(I_2/I_1) \times 100$, wherein $I_1$ and $I_2$ represent diffraction intensity in the X-ray diffraction spectral analysis of γ-type lithium aluminate and $I_1$ represents the height of a (101) peak, $I_2$ represents the height of a (200) peak. The γ-type lithium aluminate of the present invention exhibits excellent heat stability and chemical stability in a molten carbonate when used for an electrolyte-retainer plate of MCFC.

4 Claims, 11 Drawing Sheets

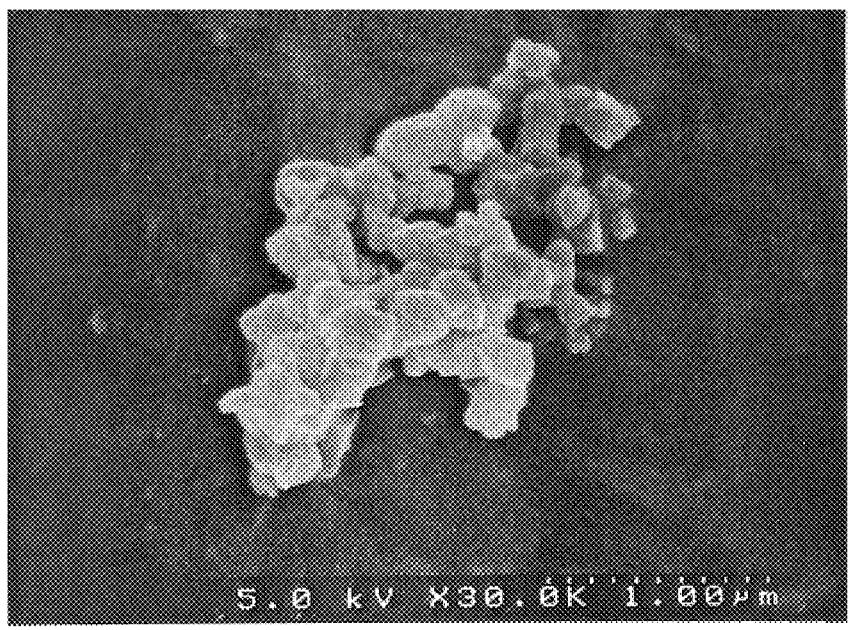
FIG·5
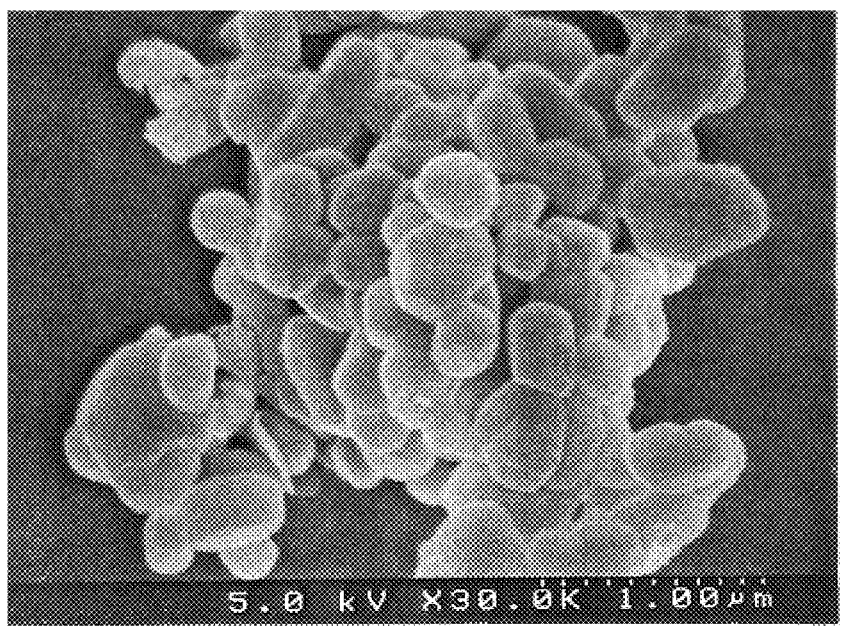
FIG·6

GAMMA LITHIUM ALUMINATE PRODUCT AND PROCESS OF MAKING

This application is a Continuation-in-part (CIP) of application Ser. No. 08/835,387 Filed on Apr. 7, 1997, abandoned.

BACKGROUND OF THE INVENTION

1. Field of the Invention

The present invention relates to lithium aluminate which is particularly useful for an electrolyte-retainer plate in a Molten Carbonate Fuel Cell (MCFC) and to an industrial preparation process thereof.

2. Description of the Related Art

An electrolyte-retainer plate of MCFC is required to have such characteristics as high molten carbonate retaining property, alkali resistance and heat resistance since it is used for retaining a mixed molten carbonate such as $Li_2CO_3$ and $K_3CO_3$ in an elevated temperature region around 650° C. As a material which satisfies the required characteristics, presently lithium aluminate has been used as a structural material of the electrolyte-retainer plate, particularly finely divided γ-type lithium aluminate having a relatively large specific surface area and excellent electrolyte retaining property has been used.

As for the technologies of producing lithium aluminate having such a large specific surface area, many suggestions have been made including those disclosed in Japanese Patent Laid-Open Nos.60-65719, 60-151975, 61-295227, 61-295228, 63-270311, 1-252522, and 2-80319. The main points of these known methods lie in increasing the specific surface area by controlling the denseness of the structure through burning a mixture of alumina and lithium hydroxide or lithium carbonate at a temperature in a range of from 600 to 1000° C., or by carrying out secondary treatment such as hydration treatment or a treatment to impart porosity.

In the specification of Japanese Patent Publication No.6-37292, a process for preparing porous lithium aluminate coarse particles has been disclosed in which silica particles and alumina particles are bonded to prepare coarse particles then they are heated to 500–1000° C. in a carbonate containing lithium ion so that the silica particles in the coarse particles are eluted into the carbonate to form pores and the alumina having pores is combined with lithium to form lithium aluminate.

However, when the γ-type lithium aluminate produced by the above-mentioned conventional technique is exposed to a high temperature in a molten electrolyte for a long time, such phenomenon appears that the γ-type structure is partly transformed into α-type, or the specific surface area is decreased by grain growth. Accordingly, when it is formed into an electrolyte-retainer plate for MCFC, it has a defect that the electrolyte retention capability may drop suddenly during its use to deteriorate the battery life.

The process of preparing porous lithium aluminate disclosed in the above-mentioned Japanese Patent Publication No.6-37292 has been proposed as a technique to alleviate such defect, however, it has problems such as being a long and complicated process since it requires special process to carry out ion exchange of lithium after obtaining coarse particles of silica-alumina, and difficulty in carrying out ion exchange completely.

As can be seen from the above description, the requirements for improving the long-life of MCFC which are becoming more and more severe, including high level of retention capability for the molten carbonate, high alkali resistance and high heat resistance, cannot be sufficiently satisfied with the conventional γ-type lithium aluminate preparation technique, besides, the conventional techniques still have some problems to be cleared before they can be used as industrial production means.

Accordingly, an object of the present invention is to solve the above-mentioned conventional problems, and in i particular, to provide γ-type lithium aluminate having excellent heat stability and chemical stability in a molten carbonate when used for an electrolyte-retainer plate of MCFC, and an industrial preparation process thereof.

SUMMARY OF THE INVENTION

As a result of an intensive study carried out in order to solve the above-mentioned problems, the present inventors found out that lithium aluminate, particularly having a specific BET specific surface area, and having a diffraction intensity ratio by lithium aluminate X-ray diffraction spectral analysis in a specific range, shows excellent properties as a material for an electrolyte-retainer plate of MCFC. The present inventors also confirmed the fact that the lithium aluminate obtained from such an alumina source as cluster particles of α-alumina which are produced by burning a finely divided aluminum compound, or porous α-alumina particles which are obtained by burning relatively coarse particles of an aluminum compound at a high temperature and thereby having a stabilized particle structure, does not change its particle structure even after being exposed to a high temperature in a molten carbonate for a long time, and shows excellent alkali resistance, heat resistance and high level of retention capability.

Therefore, according to one aspect of the present invention, there is provided γ-type lithium aluminate, a particle of which has a BET specific surface area in a range of from 1 to 15 $m^2/g$ and a synthesized degree (P) calculated according to the following equation (1) of not less than 80%.

$$\text{Synthesized degree } (P)=(I_2/I_1)\times 100 \tag{1}$$

In the equation (1), $I_1$ and $I_2$ represent diffraction intensity in the X-ray diffraction (X-RD) spectral analysis of lithium aluminate and $I_1$ represents the height of a (101) peak, $I_2$ represents the height of a (200) peak.

According to another aspect of the present invention, there is provided the above-mentioned γ-type lithium aluminate which has a BET specific surface area change rate (R) obtained according to the following equation (2) in a range of not more than 25%.

$$R=(S_2-S_1)/S_1=100 \tag{2}$$

In the equation (2), $S_1$ represents the BET specific surface area of lithium aluminate ($m^2/g$) prior to heating, and $S_2$ represents the BET specific surface area of lithium aluminate ($m^2/g$) after the heating, and the heating conditions for lithium aluminate are such that a sample and an electrolyte (constituent composition is $LI_2CO_3:K_2CO_3=62:38$ mol %) are mixed at a ratio by weight of 1:3, and subjected to treatment at 700° C. for 200 hours in an electric oven wherein the atmosphere is maintained to be air/$CO_2=70/30$.

According to a further aspect of the present invention, there is provided a method of producing γ-type lithium aluminate characterized in that cluster particles of α-alumina obtained by burning a finely divided aluminum compound are mixed with a lithium compound, where an Al/Li molar ratio is 1/0.95–1.05, by dry mixing, and the mixture is subjected to burning treatment.

According to a still further aspect of the present invention, there is provided a method of producing γ-type lithium aluminate characterized in that porous α-alumina particles and a lithium compound are mixed, where an Al/Li molar ratio is 1/0.95–1.05, by dry mixing and the mixture is subjected to burning treatment.

BRIEF DESCRIPTION OF THE DRAWINGS

FIG. 5 is a SEM photograph (magnification: ×30,000) illustrating the particle structure of lithium aluminate particles after the stabilization test of Example 2.

FIG. 6 is a SEM photograph (magnification: ×30,000) illustrating the particle structure of lithium aluminate particles after the stabilization test of Comparative Example 1.

DETAILED DESCRIPTION OF THE INVENTION

Figure 1:
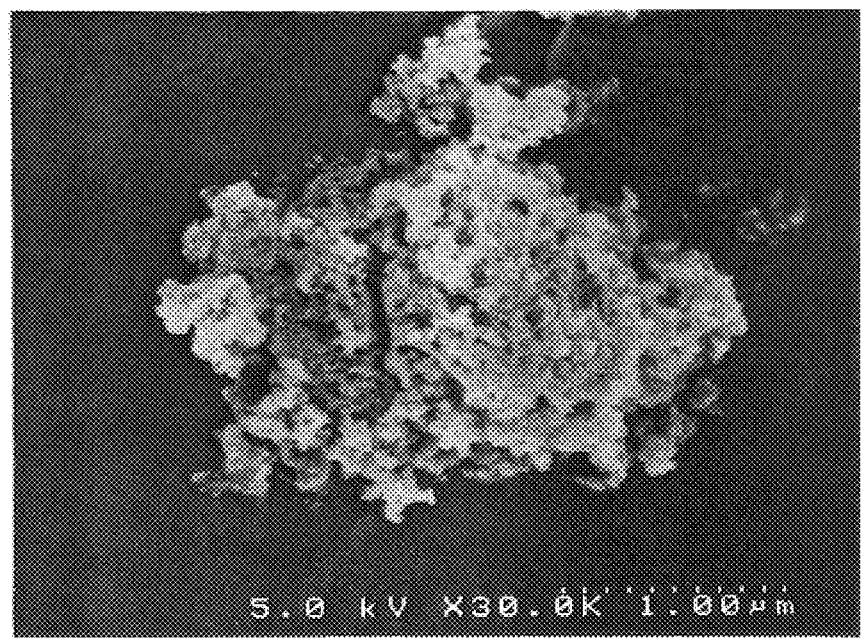
FIG. 1 is a SEM photograph (magnification: ×30,000) illustrating the particle structure of γ-alumina particles prior to burning.

What is basically required for the γ-type lithium aluminate according to the present invention is that its BET specific surface area is in a range of from 1 to 15 m$^2$/g. When lithium aluminate having the BET specific surface area of less than 1 m$^2$/g is used as a material for an electrolyte-retainer plate, its molten carbonate retaining capacity becomes insufficient and it fails to exercise expected functions, on the other hand, the lithium aluminate having the BET specific surface area exceeding 15 m$^2$/g tends to mar the durability (stability) as it undergoes a big deterioration in the electrolyte. A particularly preferable BET specific surface area is in a range between 3 and 12 m$^2$/g.

In addition to the above-mentioned basic characteristics, another important element of the present invention is that the synthesized degree (P) of the above-mentioned equation (1), represented by the diffraction intensity ratio ($I_2/I_1 \times 100$) of the (200) peak ($I_2$) to the (101) peak ($I_1$) appearing in the X-ray diffraction spectral analysis of lithium aluminate, is not less than 80%. When the synthesized degree (P) is below 80%, the lithium aluminate undergoes grain growth in a molten carbonate, thus when used for an electrolyte-retainer plate, it changes with time and the electrolyte is lost through among grains to greatly damage the battery performance.

Among the lithium aluminate having satisfied the above-mentioned property characteristics, the lithium aluminate having a BET specific surface area change rate (R) of not more than 25% is particularly preferable concerning thermal and chemical stability. The BET specific surface area change rate (R) is the ratio of a difference of the BET specific surface area of lithium aluminate before and after heat treatment ($S_2$–$S_1$), to the BET specific surface area of lithium aluminate before the heat treatment ($S_1$), which is carried out by mixing the lithium aluminate with an electrolyte having constituent composition of $LI_2CO_3$:$K_2CO_3$= 62:38 mol % at a ratio by weight of 1:3, followed by heating at 700° C. for 200 hours in an electric oven wherein the atmosphere is maintained to be air/$CO_2$=70/30. That means, when the change rate (R) is not more than 25%, the grain growth of the lithium aluminate is prevented in a molten carbonate and the deterioration of the battery performance due to the change of the material with time can be further controlled.

The crystal structure of the lithium aluminate according to the present invention mainly comprises γ-type, however, a small amount of α-type crystal mixed in it does not affect the stability performance of the lithium aluminate in an electrolyte, thus a γ-type based crystal system containing 10% by weight or less of α-type crystal is also permissible. These physical properties can be easily recognized by BET specific surface area measurement and X-ray diffraction analysis.

For industrial production of such lithium aluminate, the following two methods are favorably employed.

(i) A method of using cluster particles of α-alumina obtained by burning a finely divided aluminum compound as an alumina source.

In this method, cluster particles of α-alumina obtained by burning a finely divided aluminum compound are mixed with a lithium compound, where an Al/Li molar ratio is 1/0.95–1.05, by dry mixing, and the mixture is subjected to burning treatment.

Examples of the finely divided aluminum compound to be used as an alumina source include γ-alumina and alumina hydroxide, ammonium dawsonite and aluminum potassium sulfate, but preferable is γ-alumina. Cluster particles of α-alumina are obtained by burning treatment of fine particles of above-mentioned aluminum compound having an average particle size of 0.1–3 microns in an elevated temperature region of 1100° C. or above, preferably 1200° C. or above, and they are the particles recognized as clusters mainly containing α-alumina by X-ray diffraction. Alumina has different crystal structures depending on the burning temperature, however, in a temperature region near 1200° C., the crystallinity index of γ-type crystal is low and it is converted to α-alumina having a firm cluster form in which primary particles are aggregated. Accordingly, excellent thermal and chemical stability are acquired. Such α-alumina is mainly based on α-alumina as the crystal form, however, it can be α-alumina of such a crystal system that further contains a trace amount of other crystal structures including θ, δ, and φ. It is preferable that α-alumina comprises clusters of as fine particles as possible.

(ii) A method in which porous α-alumina particles having stabilized particle structure obtained by burning relatively coarse particles of an aluminum compound at a high temperature are used as an alumina source.

In this method, porous α-alumina particles and a lithium compound are mixed, where an Al/Li molar ratio is 1/0.95–1.05, by dry mixing and the mixture is subjected to burning treatment.

The porous α-alumina particles used as a raw material can be those which are industrially available, but particularly preferable is aluminum hydroxide converted to α-alumina by burning treatment at a temperature of 1100° C. or above, preferably 1200° C. or above. The α-alumina particles prepared in such a process contain fine and uniform small pores formed in the particle structure by the dehydration effect during the burning process, thus they have a specific porous structure with a honeycombed surface, and the particles are relatively homogeneously dispersed with little aggregation among them. In addition to that, the α-alumina shows a very stabilized structure since it is converted to α-alumina under a high temperature, for example, around 1200° C.

Lithium compounds used as the lithium source, for example, include lithium carbonate, lithium hydroxide and lithium nitrate and the like, however lithium carbonate is most effective for the purpose of the present invention. As the lithium compound is used in the form of powder, it is preferable to use fine particles having the size of not more than 10 microns, preferably not more than 5 microns.

The cluster particles of α-alumina or the porous α-alumina particles and lithium compound powder are blended at an equivalent ratio near the stoichiometry, i.e., an Al/Li molar ratio being 1/0.95–1.05, at which lithium aluminate can be obtained, and mixed under dry conditions. If the inter diffusion of powder is insufficient during the mixing process, the lithium aluminate particles resulting from the reaction partially aggregate to provide coarse particles. Accordingly, it is preferable to use one or more mixing devices selected from a high-speed dispersion mixer such as Henschel mixer, and an impact grinder such as jet mill, atomizer, and Bandam mill for the treatment. However, an attrition type grinder such as ball mill used according to the conventional technique is not suited for the purpose of the present invention since it tends to destroy the particle structure of alumina.

The raw material mixture is then subjected to burning treatment. The burning treatment is carried out in a temperature region of 800° C. or above, for example 800–1300° C. for 0.5–16 hours, preferably at a high temperature of 900° C. or above for 1–5 hours, to allow the cluster particles of α-alumina or the porous α-alumina particles to react with the lithium compound to produce lithium aluminate. The resulting product can be confirmed by X-ray diffraction if it is lithium aluminate based on γ-type crystals.

Lithium aluminate particles thus produced have a BET specific surface area in a range of from 1 to 15 $m^2/g$.

When cluster particles of α-alumina are used as an alumina source, the resulting lithium aluminate particles are fine particles in the form of an aggregated cluster, and has very stable physical properties with the above-mentioned high synthesized degree (P), and the low BET specific surface area change rate (R).

Similarly, when porous α-alumina particles are used as an alumina source, the resulting lithium aluminate particles have a specific porous structure with a honeycombed surface and have very stable physical properties with the above-mentioned high synthesized degree (P), and the low BET specific surface area change rate (R). It can be assumed that such particle characteristics depend on the particle properties of the α-alumina used as the raw material, and are formed from the porous skeleton structure of the particles. The BET specific surface area of the porous α-alumina is preferably in a range of from 1 to 20 $m^2/g$.

Lithium aluminate having such particle characteristics exhibits excellent heat stability and chemical stability in a molten carbonate at a high temperature, thereby providing a favorable material for an electrolyte-retainer plate of MCFC. The preparation process of the present invention allows industrially advantageous production of the lithium aluminate in a step simpler than those conventionally employed.

In the meantime, U.S. Pat. No. 3,998,939 (Mason et al.) discloses a production of beta-lithium aluminate. However, this patent directs to beta-lithium aluminate rather than γ-type lithium aluminate as the present invention. Further, although Japanese Patent Laid-Open No. 63-260812 discloses a method for producing a lithium aluminate fiber, this publication also disclose beta-lithium aluminate fiber rather than γ-type lithium aluminate as the present invention. Furthermore, Japanese Patent Laid-Open No. 60-65719 discloses a method for producing lithium aluminate in rod form, however, the obtained lithium aluminate has a synthesized degree of less than 80%. Still further, although an article of Kinoshita et al. (Mat. Res. Bull., Vol. 14, pp. 1357–68) also discloses a method for synthesizing lithium aluminate powder, the obtained lithium aluminate has a synthesized degree of less than 80%.

EXAMPLES

The present invention will be further illustrated with the following Examples and Comparative Examples.

Examples 1–3 and Comparative Examples 1–2

Figure 11:
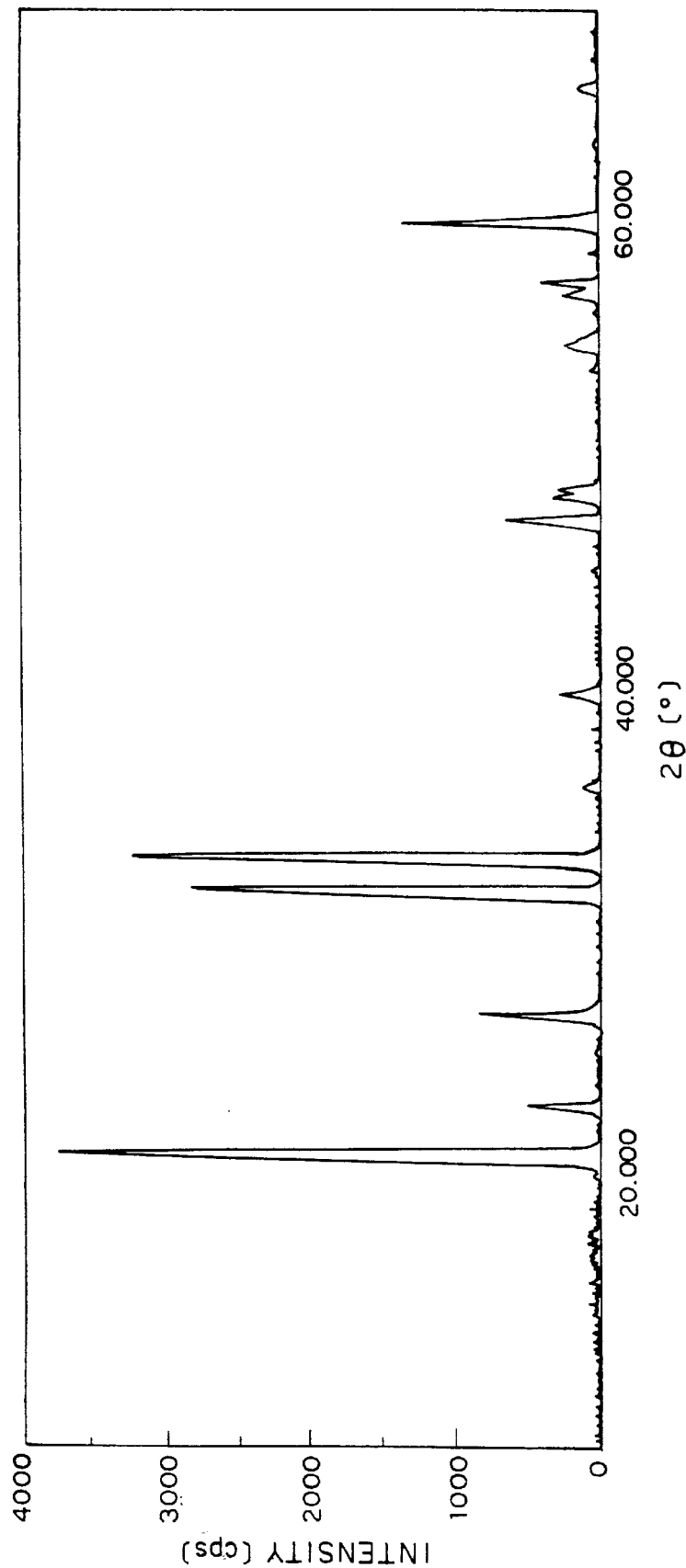
FIG. 11 represents a result of X-ray diffraction spectral analysis of Example 1.
Figure 12:
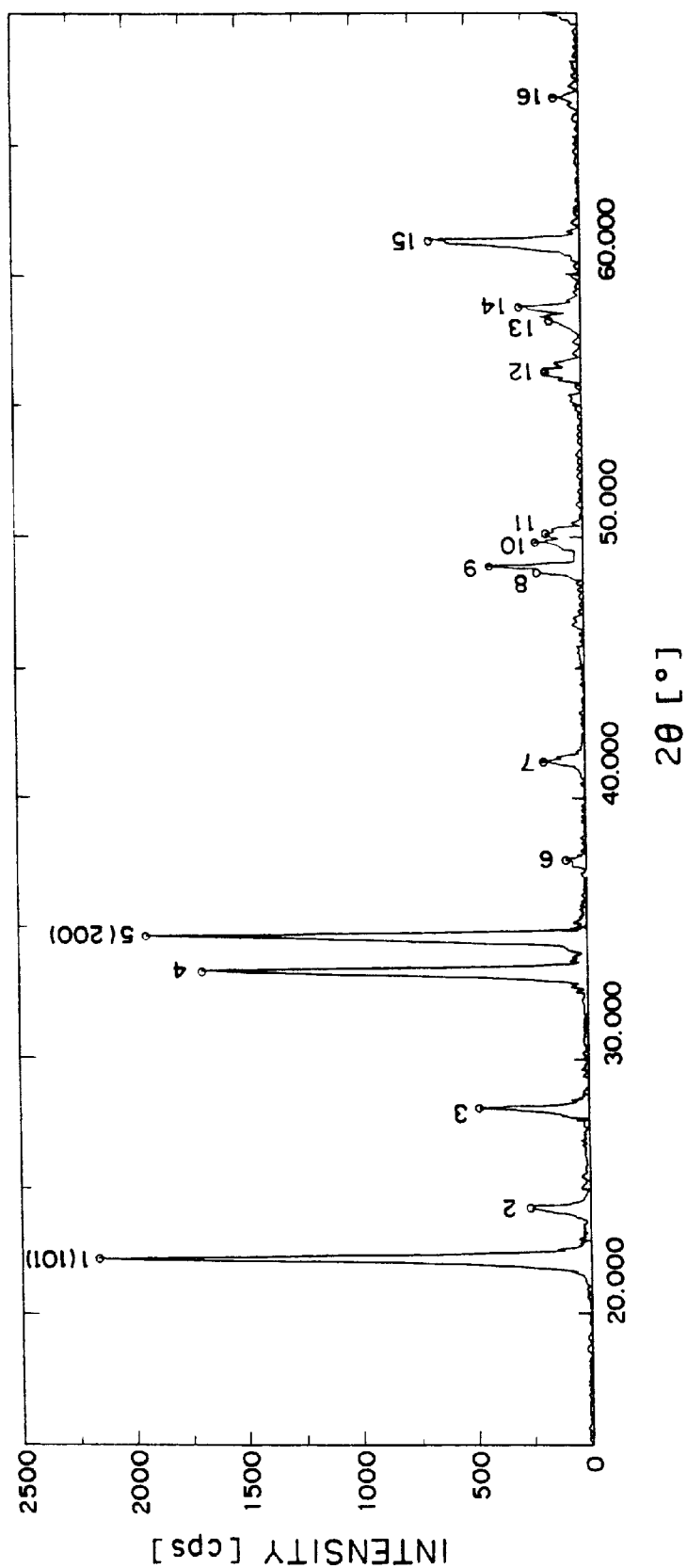
FIG. 12 represents a result of X-ray diffraction spectral analysis of Example 2.

(1) Production of Lithium Aluminate:

γ-alumina particles having an average particle size of 0.05 microns, and a BET specific surface area of 60 $m^2/g$ were burned at 1200° C. for 4 hours to prepare an alumina source comprising α-alumina powder having a BET specific surface area of 12.7 $m^2/g$. The α-alumina powder and lithium carbonate having an average particle size of 3.2 microns were so blended that the atomic weight ratio of Al and Li became stoichiometrically equivalent, and they were sufficiently homogeneously mixed by dry type Henschel mixer. The resulting mixed powder was burned at a temperature in a range of from 900 to 1100° C. as shown in Table 1 for 2 hours. Three different crystal forms, the BET specific surface area and the synthesized degree (P) of the obtained lithium aluminate were measured and the results are shown in Table 1 in contrast with the raw material compositions and the burning temperatures. As Comparative Examples 1 and 2, lithium aluminate was produced in a similar process except that the γ-alumina particles were not burned and were directly used as an alumina source, and the physical properties thereof are also listed in Table 1. Further, the results of X-ray diffraction spectral analysis of Examples 1 and 2 are shown in FIGS. 11 and 12, respectively.

Figure 2:
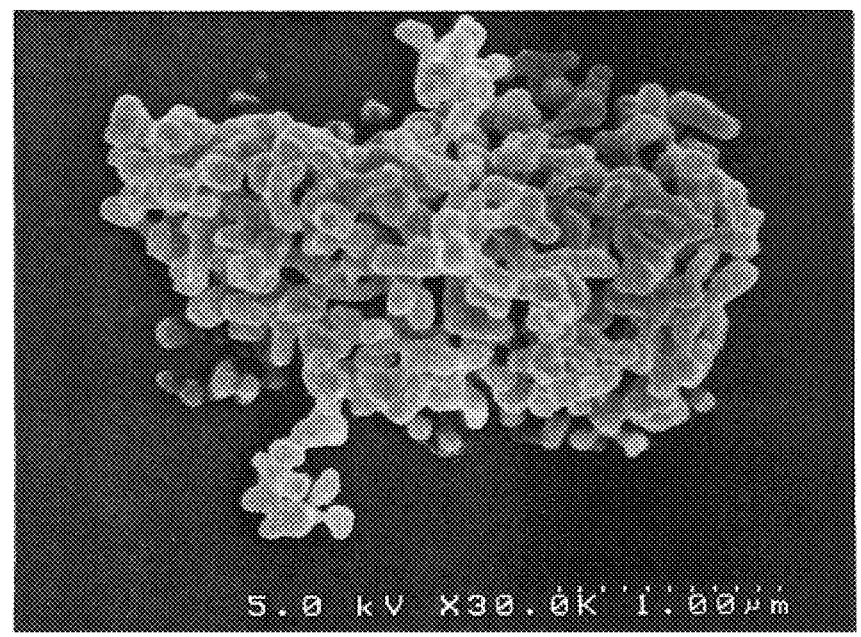
FIG. 2 is a SEM photograph (magnification: ×30,000) illustrating the particle structure of α-alumina particles which are the alumina source.
Figure 3:
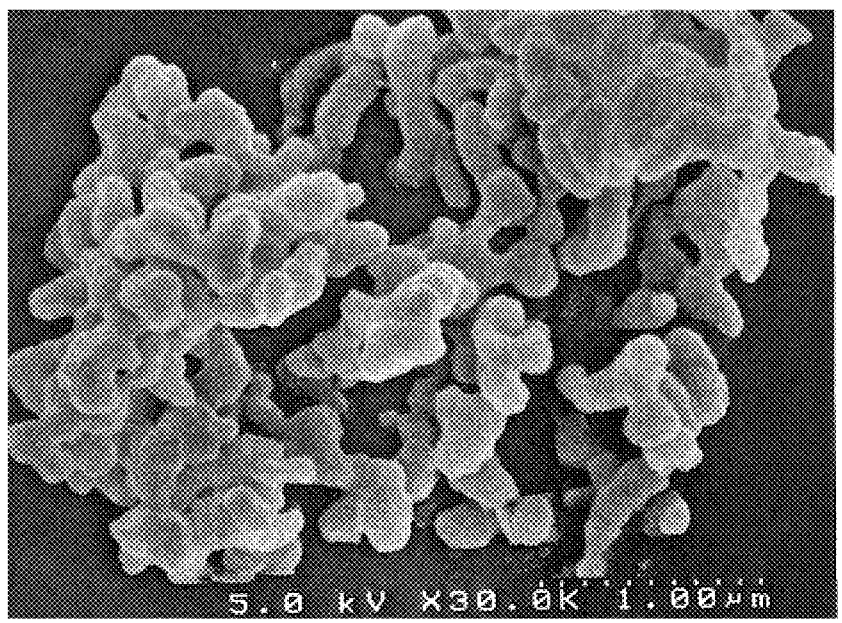
FIG. 3 is a SEM photograph (magnification: ×30, 000) illustrating the particle structure of lithium aluminate particles produced in Example 2.
Figure 4:
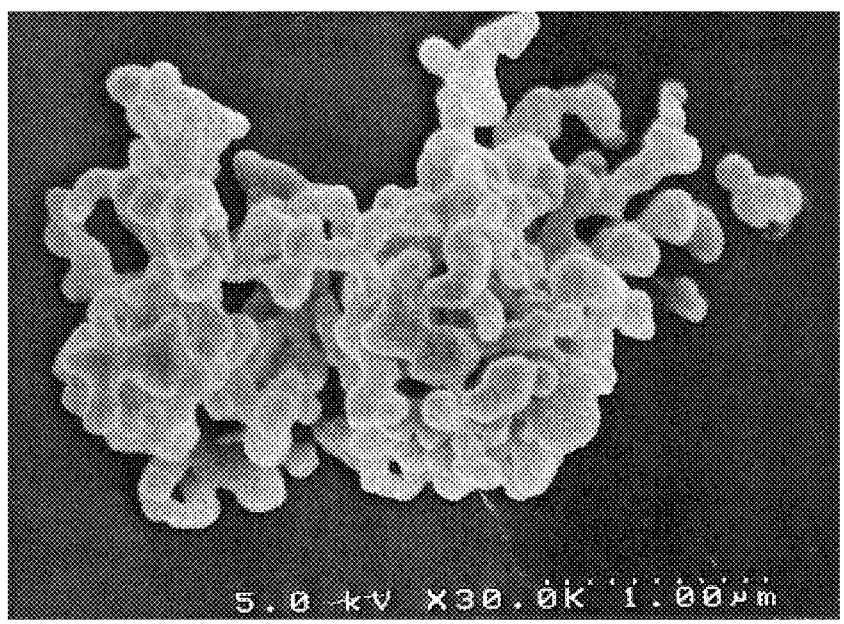
FIG. 4 is a SEM photograph (magnification: ×30, 000) illustrating the particle structure of lithium aluminate particles produced in Comparative Example 1.

FIGS. 1–4 are SEM photographs showing the particle structure in the production steps, FIG. 1 illustrates the particle structure of γ-alumina, the raw material prior to the burning, FIG. 2 illustrates the particle structure of α-alumina, the alumina source after burning, FIG. 3 illustrates the particle structure of lithium aluminate produced in Example 2, and FIG. 4 illustrates the particle structure of lithium aluminate produced in Comparative Example 1. When FIG. 1 is compared with FIG. 2, the alumina source according to the present invention can be recognized to have cluster particle structure in which the primary particles of α-alumina are aggregated.

TABLE 1

|  |  | Examples | | | Comparative Examples | |
|---|---|---|---|---|---|---|
|  |  | 1 | 2 | 3 | 1 | 2 |
| Raw material compositions | [γ-alumina] | | | | | |
|  | Av. particle size (μm) | 0.05 | 0.05 | 0.05 | 0.05 | 0.05 |
|  | BET specific surface area (m²/g) | 60 | 60 | 60 | 60 | 60 |
|  | [Pseudo α-alumina] | | | | | |
|  | BET specific surface area (m²/g) | 12.7 | 12.7 | 12.7 | — | — |
|  | [Lithium carbonate] | | | | | |
|  | Av. particle size (μm) | 3.2 | 3.2 | 3.2 | 3.2 | 3.2 |
| Burning temperature (° C.) | | 900 | 930 | 1100 | 930 | 1100 |
| [Produced lithium aluminate] | | | | | | |
| Crystal forms | | α < γ | γ | γ | γ | γ |
| BET specific surface area (m²/g) | | 10.1 | 9.5 | 8.7 | 17.3 | 10.3 |
| Synthesized degree (P) | | 85 | 88 | 90 | 74 | 76 |

(2) Stabilization Test in the Presence of a Molten Carbonate:

Lithium aluminate particles obtained in Examples 1–3, and Comparative Examples 1–2 were mixed with a solid electrolyte (constitution composition was $Li_2CO_3:K_2CO_3 = 62:38$ mol %) at a ratio by weight of 1:3, then put in an electric oven kept in an atmosphere of air/$CO_2$=70/30 and heated at 700° C. for 200 hours to carry out stabilization test. The BET specific surface area of the lithium aluminate was measured prior to and after the heat-treatment and the BET specific surface area change rate (R) was calculated and shown in Table 2. The SEM photograph of the lithium aluminate particles after the stabilization test of Example 2 is shown in FIG. 5 and the SEM photograph of lithium aluminate particles after the stabilization test of Comparative Example 1 is shown in FIG. 6 respectively.

TABLE 2

| Example No. | Ex.1 | Ex.2 | Ex.3 | Comp. Ex.1 | Comp. Ex.2 |
|---|---|---|---|---|---|
| BET specific surface area change rate (R) (%) | 9.9 | 12.6 | −19.5 | −74.0 | −46.6 |

The results in Table 2 show that the lithium aluminate according to the present invention which is based on γ-type lithium aluminate has much better stability in a molten carbonate than that of the lithium aluminate of Comparative Examples. This situation can be observed from the SEM photograph of lithium aluminate based on γ-type prior to and after the stabilization test. On the contrary, the conventional lithium aluminate (Comparative Example 1) showed greatly increased particle size after the stabilization test.

Examples 4–6

(1) Production of Lithium Aluminate:

Three different kinds of aluminum hydroxide having an apparent average particle size of 8–25 μm, and a BET specific surface area of 1–2 m²/g were burned at 1200° C. for 4 hours to give alumina powder having a BET specific surface area of 7.9–10.2 m²/g as shown in the following Table 3. The alumina powder was confirmed to be porous α-alumina powder by SEM photographs and X-ray diffraction. Then the obtained porous α-alumina particles were blended with lithium carbonate having an average particle size of 3.2 μm such that the atomic weight ratio of Al and Li became stoichiometrically equivalent, and the mixture was sufficiently uniformly mixed by dry type Henschel mixer. The resulting mixed powder was burned at 920° C. for 2 hours. After the burning, the powder resulting from the reaction was cooled and three different crystal forms (evaluated by X-ray diffraction and SEM photographs), the BET specific surface area and the synthesized degree (P) of the produced lithium aluminate were measured and the results are shown in Table 3 in contrast with the raw material compositions and the burning temperature.

TABLE 3

|  |  | Examples | | |
|---|---|---|---|---|
|  |  | 4 | 5 | 6 |
| Raw material compositions | [γ-alumina] | | | |
|  | Av. particle size (μm) | 8 | 18 | 25 |
|  | BET specific surface area (m²/g) | 2.0 | 1.4 | 1.3 |
|  | [porous α-alumina] | | | |
|  | BET specific surface area (m²/g) | 10.2 | 9.6 | 5.7 |
|  | [Lithium carbonate] | | | |
|  | Av. particle size (μm) | 3.2 | 3.2 | 3.2 |
| Burning temperature (° C.) | | 920 | 920 | 920 |
| [Produced lithium aluminate] | | | | |
| Crystal forms | | γ | γ | γ |
| BET specific surface area (m²/g) | | 6.2 | 5.7 | 5.5 |
| Synthesized degree (P) | | 82 | 81 | 80 |

Figure 7:
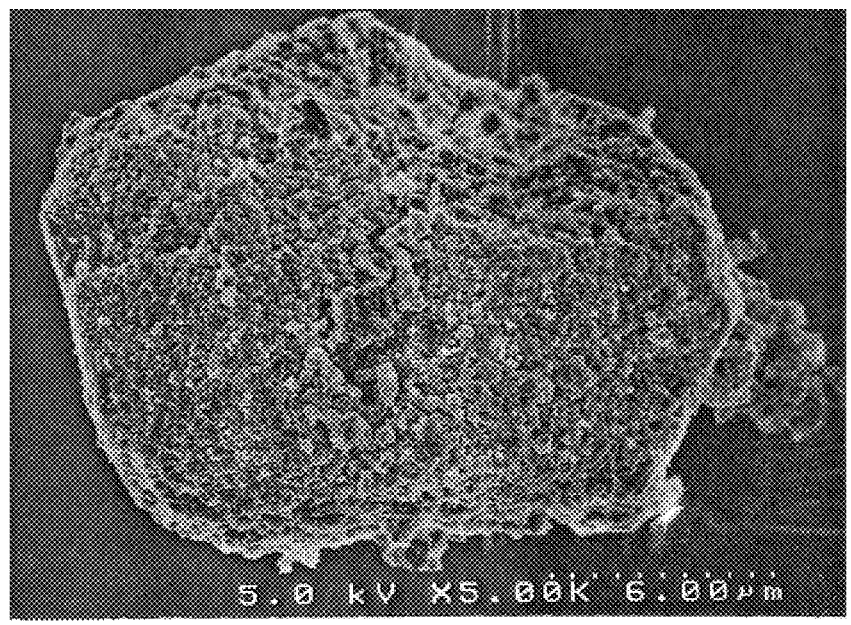
FIG. 7 is a SEM photograph (magnification: ×5,000) illustrating the particle structure of porous lithium aluminate particles prior to the stabilization test of Example 4.
Figure 8:
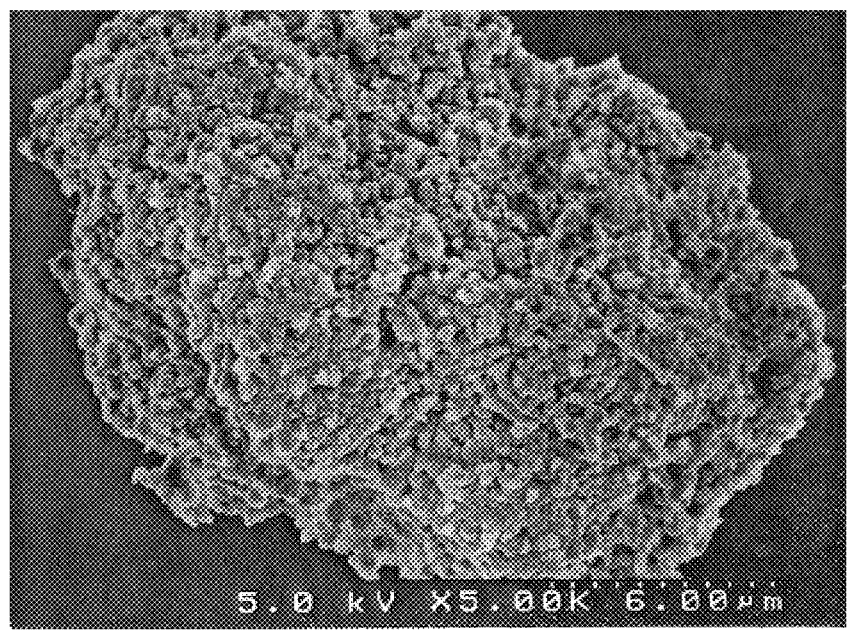
FIG. 8 is a SEM photograph (magnification: ×5,000) illustrating the particle structure of porous lithium aluminate particles after the stabilization test of Example 4.

(2) Stabilization Test in the Presence of a Molten Carbonate:

Lithium aluminate particles obtained in Examples 4–6 were subjected to stabilization test in the manner similar to those of Examples 1–3 and Comparative Examples 1–2. The results are shown in Table 4. The FIG. 7 (magnification: ×5,000) is a SEM photograph showing the particle structure of porous lithium aluminate prior to the stabilization test, and FIG. 8 (magnification: ×5,000) is a SEM photograph showing the particle structure of porous lithium aluminate after the stabilization test. A comparison made between these SEM photographs shows that there is not much change in the particle property.

Example 7

A commercially available aluminum hydroxide having an apparent average particle size of 25 μm, a BET specific surface area of 2 m$^2$/g was burned at 1200° C. for 4 hours to give alumina powder having a BET specific surface area of 7.9 m$^2$/g. The alumina powder was confirmed to be porous α-alumina powder by SEM photographs and X-ray diffraction. Then the obtained porous α-alumina powder was blended with lithium carbonate having an average particle size of 3.2 μm such that the atomic weight ratio of Al and Li became stoichiometrically equivalent, then sufficiently uniformly mixed by dry type Henschel mixer. The resulting mixed powder was burned at 1100° C. for 2 hours. After the burning, the powder resulting from the reaction was cooled and subjected to evaluation by X-ray diffraction and SEM photographs, and it was confirmed to be γ-type porous lithium aluminate. The BET specific surface area of the obtained γ-type porous lithium aluminate particles was 3.1 m$^2$/g. The γ-type porous lithium aluminate particles were subjected to the stabilization test in a molten carbonate in the manner similar to those of the above-mentioned Examples. The results are shown in Table 4.

Comparative Example 3

Commercially available aluminum hydroxide particles having an apparent average particle size of 25 A m, a BET specific surface area of 2 m$^2$/g were blended with lithium carbonate having an average particle size of 3.2 μm such that the atomic weight ratio of Al and Li became stoichiometrically equivalent, then sufficiently uniformly mixed by dry type Henschel mixer. The resulting mixed powder was burned at 1100° C. for 2 hours. After the burning, the powder resulting from the reaction was cooled and subjected to evaluation by X-ray diffraction and SEM photographs, and it was confirmed to be γ-type but non-porous lithium auminate, whose BET specific surface area was 2.9 m$^2$/g. The nonporous lithium aluminate particles were subjected to the stabilization test in a molten carbonate in the manner similar to those of the above-mentioned Examples. The results are shown in Table 4.

Figure 9:
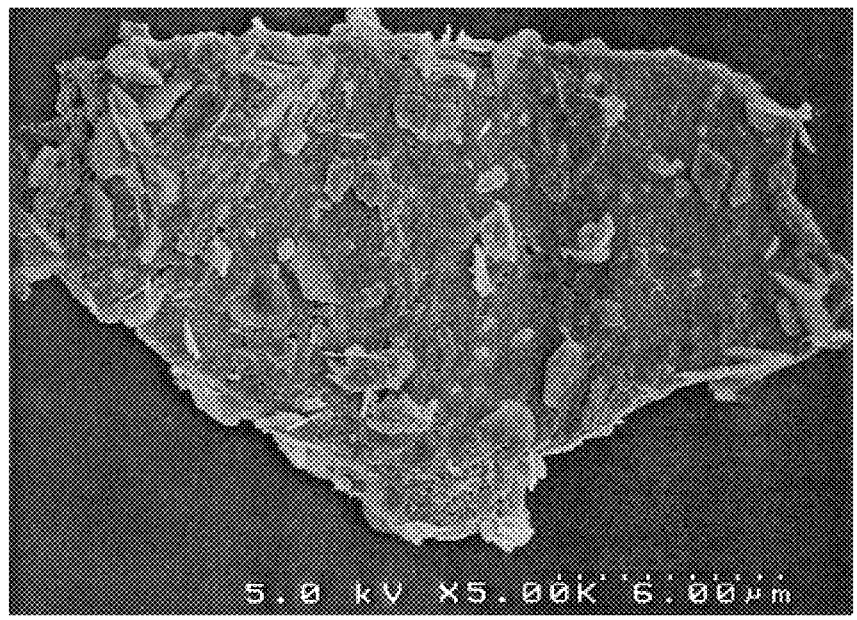
FIG. 9 is a SEM photograph (magnification: ×5,000) illustrating the particle structure of non-porous lithium aluminate particles prior to the stabilization test of Comparative Example 1.
Figure 10:
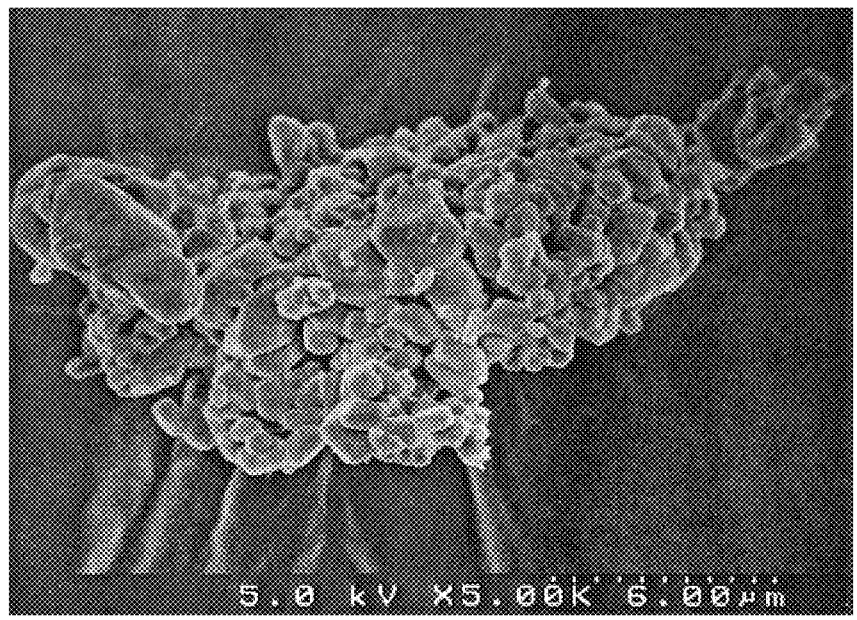
FIG. 10 is a SEM photograph (magnification: ×5,000) illustrating the particle structure of non-porous lithium aluminate particles after the stabilization test of Comparative Example 1.

The FIG. 9 (magnification: x5,000) is a SEM photograph showing the particle structure of nonporous lithium aluminate particles prior to the stabilization test, and FIG. 10 (magnification: x5,000) is a SEM photograph showing the particle structure of nonporous lithium aluminate after the stabilization test. A comparison made between these SEM photographs shows that there is a remarkable change in the particle property.

TABLE 4

| Example No. | Ex.4 | Ex.5 | Ex.6 | Ex.7 | Comp.Ex.3 |
|---|---|---|---|---|---|
| BET specific surface area change rate (R)(%) prior to stabilization test (m$^2$/g) | 6.2 | 5.7 | 5.5 | 3.1 | 2.9 |
| BET specific surface area change rate (R)(%) after stabilization test (m$^2$/g) | 4.8 | -3.5 | 1.8 | 13.0 | -26.3 |

Comparative Example 4

An object of the following comparative example is to provide data that lithium aluminate produced by a method disclosed in Japanese Patent Laid-Open No. 60-65719 has a synthesized degree of less than 80%.

LiOH.H$_2$O and Al(OH)$_3$ were used as raw materials for producing LiAlO$_2$, while NaCl and KCl were used as a flux. These raw materials were obtained in the following mixing ratio.

Reactants: Flux=45:55 (weight ratio)

LiOH.H$_2$O/Al(OH)$_3$=1.02 (equivalent ratio)

NaCl/KCl=1:1 (mol ratio)

The above raw materials were mixed together, an ethyl alcohol was add so as to form a slurry. The slurry was then treated in a ball mill for 17 hours. Afterwards, the slurry was subjected to a drying treatment in a dryer to remove the ethyl alcohol component therefrom. The dried slurry was then moved into a crucible made of high purity alumina, and was heated in an electric furnace at a heating rate of 100° C./h until it arrives at a temperature of 650° C. Subsequently, the heated material was kept at the same temperature for one hour, and then was cooled to a room temperature.

The above treated material was washed and then dispersed in an exceeded ion-exchange water so as to dissolve water soluble components, thereby forming a water solution. The water solution was stirred and was caused to stand still. Then, the solution was washed sufficiently for several times using an inclination method in which the upper clean liquid layer is usually removed, followed by filterring treatment. Further, a filterring paper was used to perform water washing, and LiAlO$_2$ was separated, followed by drying treatment in a dryer at a temperature of 120° C. for 50 hours. The dried product was a mixture containing βLiAlO$_2$, αLiAlO$_2$, LiAl$_2$(OH)$_7$.2H$_2$O, having a BET specific surface of 63.4 m$^2$/g.

Figure 13:
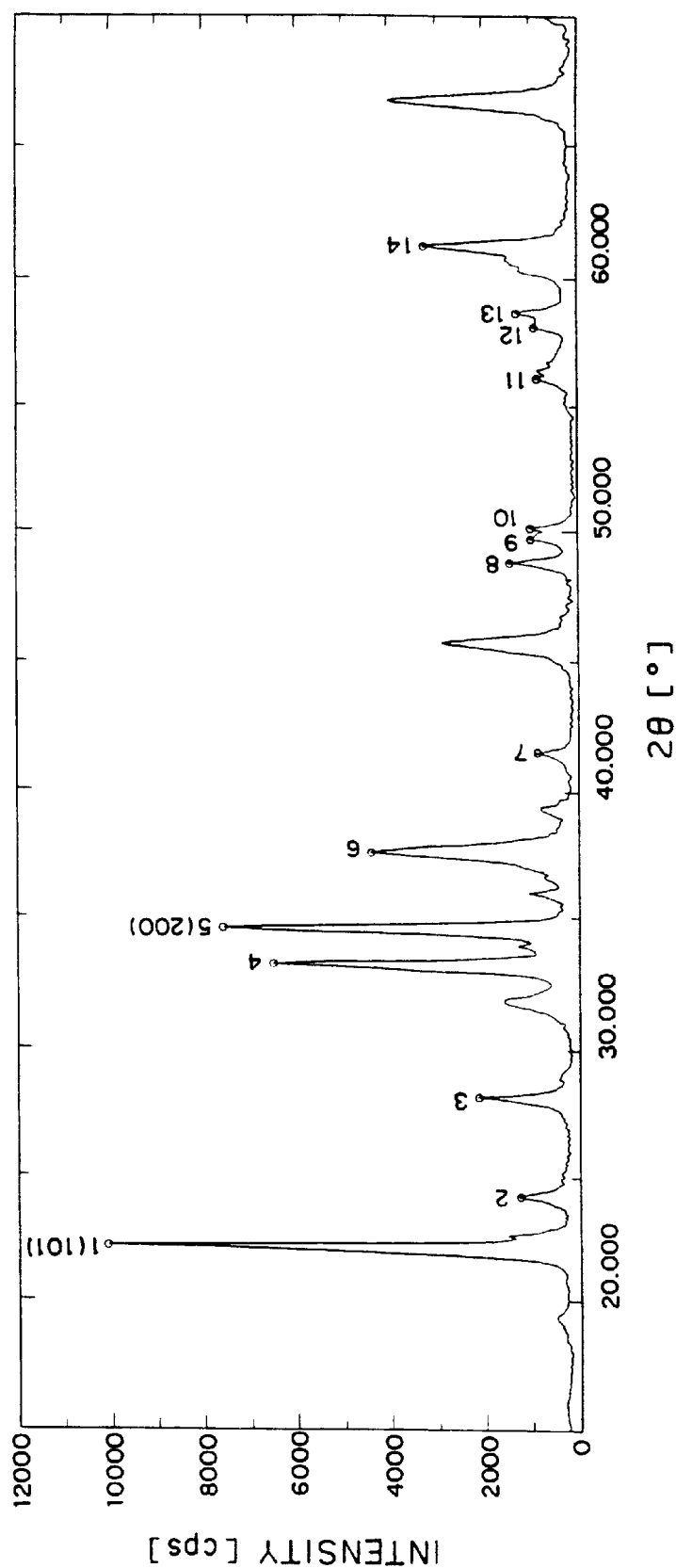
FIG. 13 represents a result of X-ray diffraction spectral analysis of Comparative Example 4.
Figure 14:
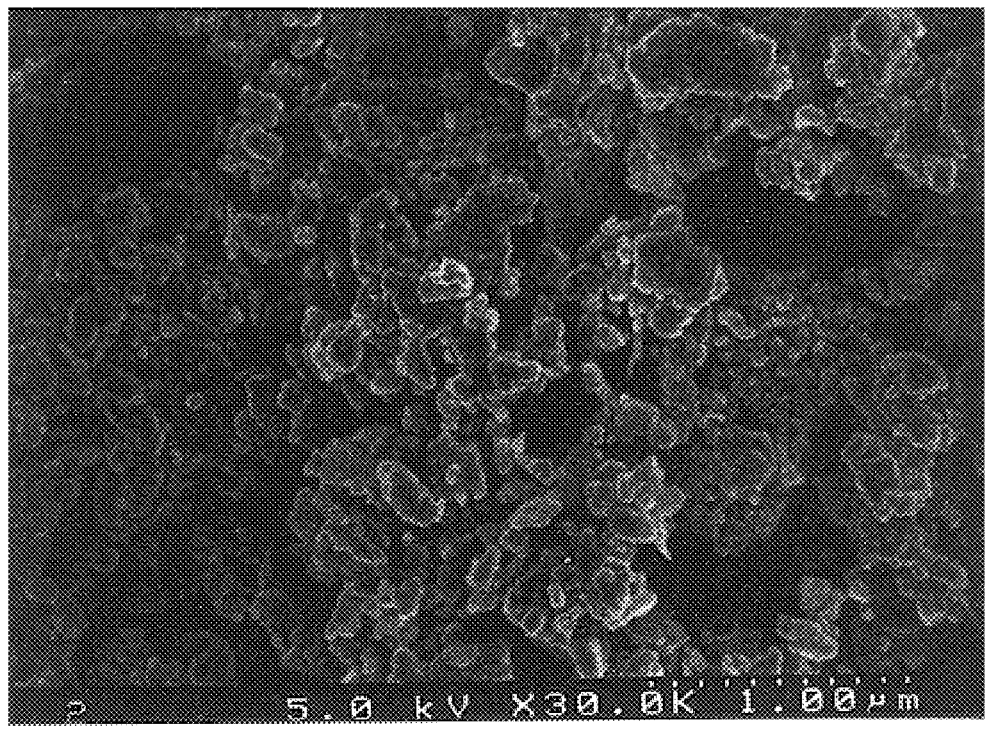
FIG. 14 is a SEM photograph (magnification: ×30,000) illustrating the particle structure obtained by Comparative Example 4.

Further, the dried product was heated at a heating rate of 100° C./h until it arrived at a temperature of 800° C. Subsequently, the heated material was kept at the same temperature for 24 hours, and then was cooled to a room temperature. LiAlO$_2$ obtained in the above process was measured in its synthesized degree, crystal form, BET specific surface, with the measured results indicated in Table 5. In addition, its X-ray diffraction chart is shown in FIG. 13, and its SEM photograph is shown in FIG. 14.

Comparative Example 5

An object of the following comparative example is to provide data that lithium aluminate produced by a method disclosed in an article of Kinoshita et al. (Mat. Res. Bull., Vol. 14, pp. 1357–68) has a synthesized degree of less than 80%.

Figure 15:
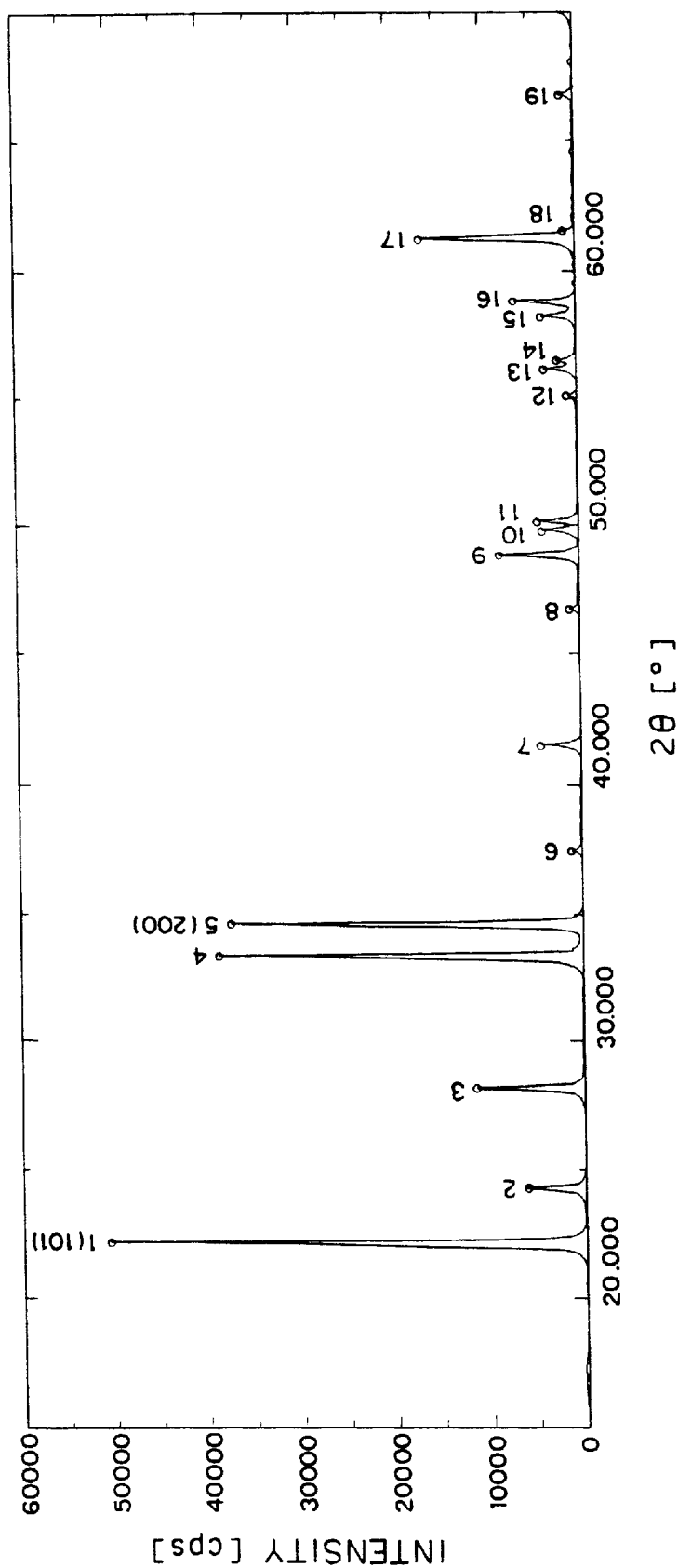
FIG. 15 represents a result of X-ray diffraction spectral analysis of Comparative Example 5.
Figure 16:
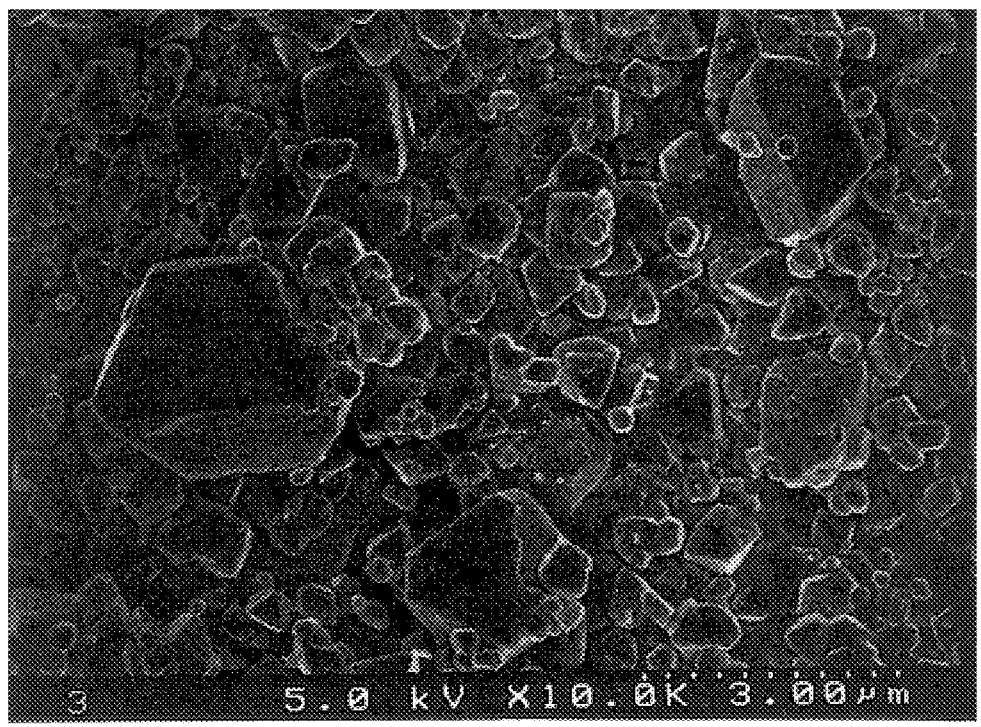
FIG. 16 is a SEM photograph (magnification: ×10,000) illustrating the particle structure obtained by Comparative Example 5.

A mixture was prepared in accordance with a composition which may be described as Li(OH).H$_2$O :αAl$_2$O$_3$:Li$_2$CO$_3$:K$_2$CO$_3$=2:1:1:0.6 mol, and was calcined at a temperature of 700° C. for 21 hours. The calcined mixture was then stirred in a solution of acetic acid : acetic anhydride=1 : 1, filtered, and washed in ethanol, followed by a drying treatment with the use of a dryer. LiAlO$_2$ obtained in the above process was measured in its synthesized degree, crystal form, BET specific surface, with the measured results indicated in Table 5. Meanwhile, its X-ray diffraction chart is shown in FIG. 15, and its SEM photograph is shown in FIG. 16.

TABLE 5

| Test materials | Synthesized degree | Crystal form | BET Specific surface/m$^2$/g |
| --- | --- | --- | --- |
| Comparative Example 4 | 75 | γ-LiAlO$_2$ > LiAl$_5$O$_8$* | 33.0 |
| Comparative Example 5 | 73 | γ-LiAlO$_2$ | 4.4 |

*A mixture of γ-LiAlO$_2$ and LiAl$_5$O$_8$ were produced with its main component being γ-LiAlO$_2$. This was understood from X-ray diffraction (See FIG. 13).

While the invention has been described in detail and with reference to specific embodiments thereof, it will be apparent to one of ordinary skill in the art that various changes and modifications can be made therein without departing from the spirit and scope thereof.

What is claimed is:

1. A method of producing γ-lithium aluminate comprising
   dry mixing cluster particles of α-alumina, obtained by burning a finely divided aluminum compound, with a lithium compound to form a mixture where an Al to Li molar ratio is 1 to 0.95–1.05, and
   burning said mixture at a temperature of 800° C. or more.

2. A method of producing γ-lithium aluminate comprising
   dry mixing porous α-alumina particles with a lithium compound to form a mixture where an Al to Li molar ratio is 1 to 0.95–1.05, and
   burning said mixture at a temperature of 800° C. or more.

3. A method of producing y-lithium aluminate according to claim 2, wherein the α-alumina particles are obtained by burning aluminum hydroxide.

4. A method of producing γ-type lithium aluminate according to claim 1 or 3, wherein the BET specific surface area of the porous α-alumina particles is in a range of from 1 to 20 m$^2$/g.

* * * * *

UNITED STATES PATENT AND TRADEMARK OFFICE
CERTIFICATE OF CORRECTION

PATENT NO.    : 6,290,928 B1
DATED         : September 18, 2001
INVENTOR(S)   : Takahashi et al.

It is certified that error appears in the above-identified patent and that said Letters Patent is hereby corrected as shown below:

<u>Title page,</u>
Item [73], the Assignee's information should read:
-- [73] Assignees: Nippon Chemical Industrial Co., Ltd;
                Ishikawajima-Harima Heavy Industries Co., Ltd.,
          both of Tokyo (JP) --

Item [45] and the Notice information should read:
-- [45] Date of Patent:    *Sep. 18, 2001
(*) Notice:   This patent issued on a continued prosecution
application filed under 37 CFR 1.53(d), and is
subject to the twenty year patent term provisions
of 35 U.S.C. 154(a)(2).

Subject to any disclaimer, the term of this
patent is extended or adjusted under 35
U.S.C. 154(b) by 0 days.

Signed and Sealed this

Fourteenth Day of May, 2002

Attest:

*Attesting Officer*

JAMES E. ROGAN
*Director of the United States Patent and Trademark Office*